United States Patent
Sleep et al.

(10) Patent No.: US 11,837,108 B2
(45) Date of Patent: Dec. 5, 2023

(54) DEVICE AND A SYSTEM FOR SIMULATED ULTRASOUND-GUIDED NEEDLING

(71) Applicant: INTELLIGENT ULTRASOUND LIMITED, Cardiff (GB)

(72) Inventors: Nicholas James Sleep, Cardiff (GB);
Stephen Margetts, Cardiff (GB);
Wesley George Freeman, Cardiff (GB)

(73) Assignee: INTELLIGENT ULTRASOUND LIMITED

( * ) Notice: Subject to any disclaimer, the term of this patent is extended or adjusted under 35 U.S.C. 154(b) by 127 days.

(21) Appl. No.: 17/609,083

(22) PCT Filed: May 5, 2020

(86) PCT No.: PCT/GB2020/051098
§ 371 (c)(1),
(2) Date: Nov. 5, 2021

(87) PCT Pub. No.: WO2020/229796
PCT Pub. Date: Nov. 19, 2020

(65) Prior Publication Data
US 2022/0230561 A1      Jul. 21, 2022

(30) Foreign Application Priority Data

May 10, 2019   (GB) ...................... 1906655

(51) Int. Cl.
*G09B 23/28*   (2006.01)
*G06T 11/00*   (2006.01)

(52) U.S. Cl.
CPC ............ *G09B 23/285* (2013.01); *G06T 11/00* (2013.01); *G06T 2210/41* (2013.01)

(58) Field of Classification Search
CPC .... G09B 23/285; G06T 11/00; G06T 2210/41
See application file for complete search history.

(56) References Cited

U.S. PATENT DOCUMENTS

2016/0104393 A1*   4/2016   Savitsky ............. G09B 23/285
                                                            434/262
2018/0225992 A1*   8/2018   Gonsalves ........... G09B 23/285

FOREIGN PATENT DOCUMENTS

| WO | 2018035310 | 2/2018 |
| WO | 2018183772 | 10/2018 |
| WO | 2010069360 | 6/2020 |

OTHER PUBLICATIONS

Great Britain Search Report dated Nov. 25, 2019 issued in corresponding Great Britain Application No. 1906655.4.

(Continued)

*Primary Examiner* — Robert P Bullington, Esq.
(74) *Attorney, Agent, or Firm* — Onello & Mello, LLP (57) ABSTRACT

This invention relates to a computer-implemented simulation system comprising a needle device having a retractable needle shaft comprising a resistance mechanism which can be activated to vary the resistance of the needle shaft. A processing module is configured to: receive ultrasound image data representative of a subject being scanned, receive position and orientation data representative of an ultrasound probe and a needle device, calculate a projected path for the needle device and generate a simulation needle from the projected path. When the simulation needle is determined to intersect with an identified tissue type, it modulates a signal and sends the modulated signal to the resistance mechanism, thereby to cause a change in the resistive force acting on the retractable needle shaft. The invention also relates to a computer-implemented method for simulating ultrasound guided needling using this system.

16 Claims, 8 Drawing Sheets

(56) References Cited

OTHER PUBLICATIONS

International Search Report and Written Opinion dated Jul. 13, 2020 issued in corresponding International Application No. PCT/GB2020/051098.

* cited by examiner

DEVICE AND A SYSTEM FOR SIMULATED ULTRASOUND-GUIDED NEEDLING

The present invention relates to a device and a system for ultrasound-guided needling. Specifically, but not necessarily exclusively the invention relates to a device and a system for use in training medical professionals in interventional needling techniques without the need for inserting a needle into the subject. This allows a medical professional to rehearse a needling procedure on a patient.

BACKGROUND TO THE INVENTION

During medical training it is necessary to train medical professionals on how to safely conduct needling techniques by practical training methods. Needling techniques are used in conjunction with ultrasound transducers in order to allow the medical professional to "see" where the needle is penetrating inside the patient's body. Such techniques are used, for example, in ultrasound-guided needle biopsies used to locate a lesion or mass inside the body, and remove a tissue sample of the lesion or mass for testing. Inexperience in such techniques can lead to discomfort, injury or even severe damage caused to the patient, for example hemorrhaging or pneumothorax. This is particularly an issue where the procedure is taking place on or near a vital organ or vessel. Therefore there is a requirement to provide training for this and other kinds of needling techniques in an environment where mistakes and errors in technique are not causing damage or harm to patients.

In certain cases where the patient has unusual or complex anatomy, it may be advantageous even for an experienced professional to safely rehearse a procedure to gain familiarity with the specific anatomy in question.

One solution is to provide a training "dummy" or mannequin-type device, on which such techniques may be practiced. However this is not suitable for ultrasound-guided needling since the dummy does not have muscles and tendons, vascular system, fat layers, nerves or bones. Additionally, such mannequin-type training devices limit the realism of the ultrasound scan viewed and the variation of cases, ultimately resulting in a limited training experience. They are also necessarily limited in the number of anatomical variants they provide, restricting training potential and preventing use for patient rehearsal.

It is known in the art to use an ultrasound probe device and a retractable blunt needle controller device to provide a necessary training tool. For example, U.S. patent application Ser. No. 14/882,331 describes one such system wherein a simulated ultrasound scan is displayed on a screen with a simulated needle superposed over the display. Movement sensors in the needle controller device and the ultrasound probe device allow the system to display images indicative of the relative positions.

U.S. Ser. No. 14/882,331 also discloses optionally including a haptic feedback unit to notify the user when the virtual needle meets a tissue boundary.

However, the above solutions do not address the aforementioned issues wherein the realism of the training experience is limited by not using live ultrasound from a person. By only displaying a limited number of simulated ultrasound scans, the variation in cases severely limits what the user can expect to see compared to real-life scenarios. Patient rehearsal is impossible for the same reasons.

As such, there is a need to provide an improved ultrasound-guided needling training system and method. There is also a continued ongoing desire to reduce costs and expenses related to medical training, and medical equipment, and also to reduce the chances of procedural errors made by the practitioner.

STATEMENTS OF THE INVENTION

Aspects of the present invention aim to address at least some of the above-described issues. In accordance with a first aspect of the present invention there is provided a system for simulating ultrasound-guided needling according to claim 1.

The system of the present invention allows the user to experience a "true-to-life" haptic feedback as they advance the simulation needle through a real, live ultrasound scan display of a volunteer or patient. The resistive forces of the needle shaft emulates the feeling that the user can expect to experience if they were to perform the same technique on a real patient, using a real needle. This is made possible by the processing module which utilises machine-learning techniques to identify tissue types and boundaries in real-time live image data from the ultrasound module, which is scanning a real body or body part. Therefore, the user benefits from not only receiving true-to-life haptic feedback, but also from viewing a real-time ultrasound image.

It should be noted that although there is described a system connected to a live ultrasound feed, it will be apparent to a person skilled in the art that the same system could also be applied to simulated or "canned" ultrasound images generated by an ultrasound simulator designed for training, such as ScanTrainer.

In accordance with a second aspect of the present invention, there is provided a method for simulating ultrasound-guided needling using the system of claim 1, according to claim 16 of the appended claims.

BRIEF DESCRIPTION OF THE DRAWINGS

Embodiments of the invention will now be described by reference to specific examples as illustrated in the accompanying drawings, in which.

SPECIFIC DESCRIPTION

Directional descriptors are used throughout the following specific description, such as up, down, left, right, inside, outside, clockwise, anti-clockwise and so on. It will be understood by those skilled in the art that the present invention is described as oriented in the drawings, however the invention may not necessarily be limited to only being oriented thus, and therefore the directional descriptors are not intended to limit the invention in this regard.

Figure 1:
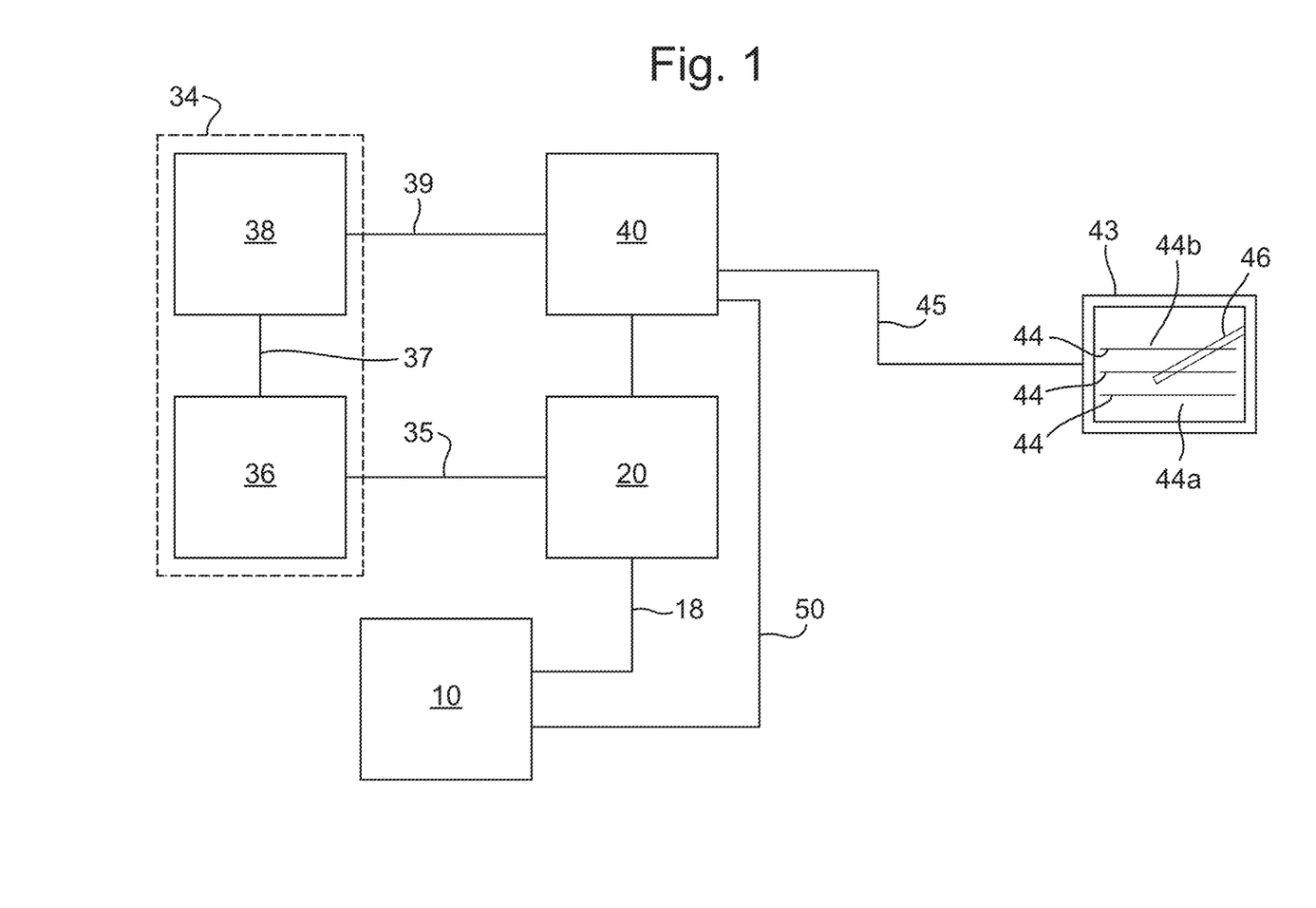
FIG. 1 is a schematic diagram of an exemplary embodiment of an ultrasound guided needling training system according to one exemplary embodiment of the invention.
Figure 2A:
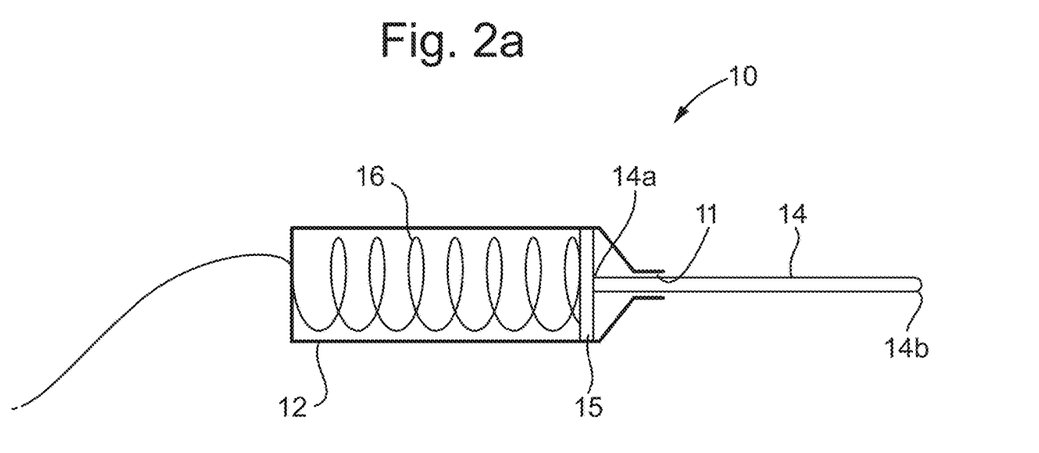
FIGS. 2a and 2b are schematic diagrams of a needle device for use in the system of FIG. 1.
Figure 2B:
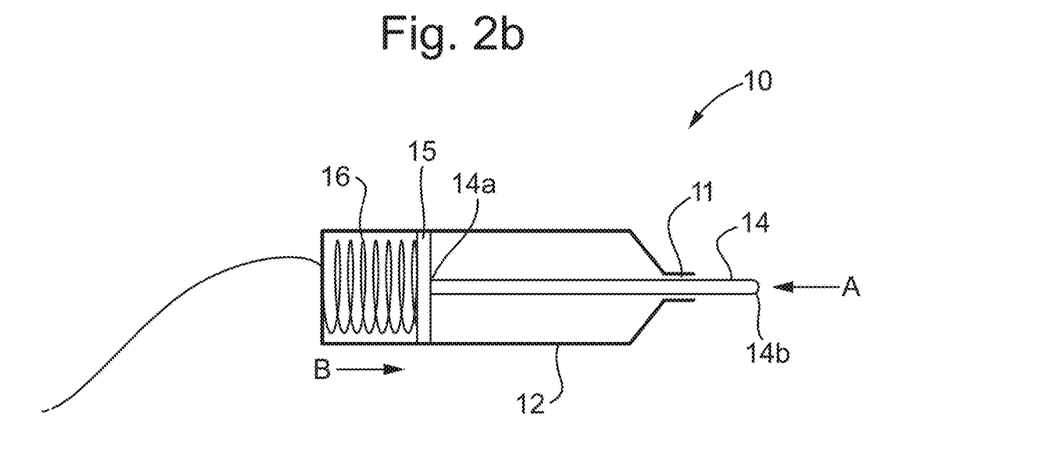

Referring to FIGS. 1, 2a and 2b of the drawings, a system for simulating ultrasound guided needling includes a needle device 10 having a casing 12 and a retractable needle shaft 14. The casing 12 is hollow and generally cylindrical in shape. The physical form is designed to approximately imitate common needling equipment. Variations on the design will have one or more parts or features that have the appearance of the components of such, i.e. hypodermic needle syringe, barrel, plunger, needle, needle hub and so on, in order to make the form of the training equipment as familiar to the trainees as possible. At one end, there is a closed end which defines the rear end of the needle device 10. At an opposing end the casing forms a cone shape which terminates in an opening 11 through which the needle shaft 14 extends. The needle shaft 14 is located within the casing 12 having an enclosed end 14a which is held within the casing and terminates in a plate 15, and a blunted exposed end 14b which extends beyond the casing.

When pressure is applied to the exposed end 14b of the needle shaft 14, the needle shaft 14 retreats into the casing 12. A biasing means 16 (shown in this exemplary embodiment as a helical spring 16) is fitted between the plate 15 and the rear end of the casing, and provides a base level of resistance against pressure applied to the exposed end 14b of the needle shaft 14. Referring specifically to FIG. 2a of the drawings, the needle shaft 14 is illustrated in a first configuration wherein no pressure is applied to the exposed end 14b. Referring specifically to FIG. 2b of the drawings, a force (i.e., pressure) is applied in the direction of arrow A, causing the needle shaft 14 to move toward the rear end of the casing, also in the direction of arrow A. The biasing means 16, or spring 16, compresses causing the potential energy within the spring 16 to build up and creates an opposing resistive force in the direction of arrow B. When the pressure is no longer acting in the direction of arrow A, the biasing means acts to return the needle shaft 12 to its resting position as illustrated in FIG. 2a. A regular helical spring is known to have an increasing resistive force. Other types of biasing means 16 are known in the art which can be altered to provide a continuous resistive force even as they are compressed/deformed. For example, the biasing spring can be supplemented by or replaced by the action of a controllable actuator which is capable of driving the needle outwards from the barrel, and optionally inwards as well. It will be apparent to those skilled in the art that other types of biasing means 16 are suitable.

The retractable needle shaft 14 gives the illusion that the needle is being inserted into whatever surface it is pushed against (e.g., the skin of a volunteer), without actually piercing that surface. Therefore, it is a necessary requirement that the resistive force of the needle device 10 is not so strong that the blunted exposed end 14b of the needle causes damage to the surface against which it is pressed, but also not so weak that it fails to simulate the force required to push a needle through a tissue boundary in a real-life scenario.

It is an important part of the exemplary embodiment of the invention that the resistive force against an applied pressure is configured to be variable for reasons which will be explained hereinafter. Mechanically, a variable resistive force can be achieved in a number of different ways, many of which will be known to the person skilled in the art, and the invention is not necessarily intended to be limited in this regard.

For example, a braking mechanism (not shown, but an example might be a friction pad which is pressed against the needle by a servo moto) may be present in the casing 12 of the needle device 10 to apply a variable braking force to the needle shaft 14 causing the user to apply a larger pressure to the exposed end of the needle 14b in order to cause the needle shaft 14 to retract further into the casing 10.

The needle device 10 may include an electromagnetic braked needle (not shown) and a spring. The spring provides a small amount of constant (linear) force which is enough to return the needle to its extended (i.e., not retracted) position. The electromagnetic braking is provided by a motor (not shown) centred in the needle device body, coaxial with the needle shaft 14. The motor is configured to receive the enclosed end 14a of the needle shaft 14. Other braking mechanisms will be apparent to those skilled in the art and the present invention is not necessarily intended to be limited in this regard.

Alternatively the needle device itself may comprise an electromagnetic actuation mechanism only, dispensing with a spring and providing only a motor to supply the resistive force of the needle against the force supplied by the user and the simulated needle through tissue layers (as will be described in more detail hereinafter). In such a setup, the motor must be capable of generating enough torque to provide realistic haptic feedback to the user.

The needle shaft 14 fits to a free collar within the motor which is configured to move linearly as the motor rotates, for example by use of corresponding screw-threaded portions. Thus turning of the motor retracts and extends the needle. Conversely extension of the needle shaft (due to returning force provided by biasing means) or retraction of the needle (due to pressure applied on the exposed end of the needle shaft 14b by a user during use) causing turning of the motor.

Other suitable set-ups will be apparent to those skilled in the art and the present invention is not necessarily intended to be limited in this regard.

Referring back to FIG. 1 of the drawings, the needle device 10 is communicably coupled to a tracking module 20. In FIG. 1 of the drawings, the tracking module 20 is illustrated as being connected to the needle device 10 by a communication line 18. The tracking module 20 may comprise a tracking sensor physically attached to the needle device 10. This communication line 18 may be wired or wireless. In general, the tracking module 20 is configured to capture data representative of the needle device 10. Specifically, the tracking module 20 is to capture data representative of the position and/or orientation of the needle device 10.

The tracking module 20 includes a processor and hardware required to track the position and orientation of the needle device 10. For example, the hardware may include using commercial off-the-shelf products which will be known in the art, for example, the Ascension TrackSTAR device, or camera-based tracking devices using fiducial markers such as "ArUco" augmented reality tracking markers, or marker less camera and IMU tracking, based on, for example, visual or visual-inertial techniques, depth cameras and related positional tracking techniques.

Figure 3:
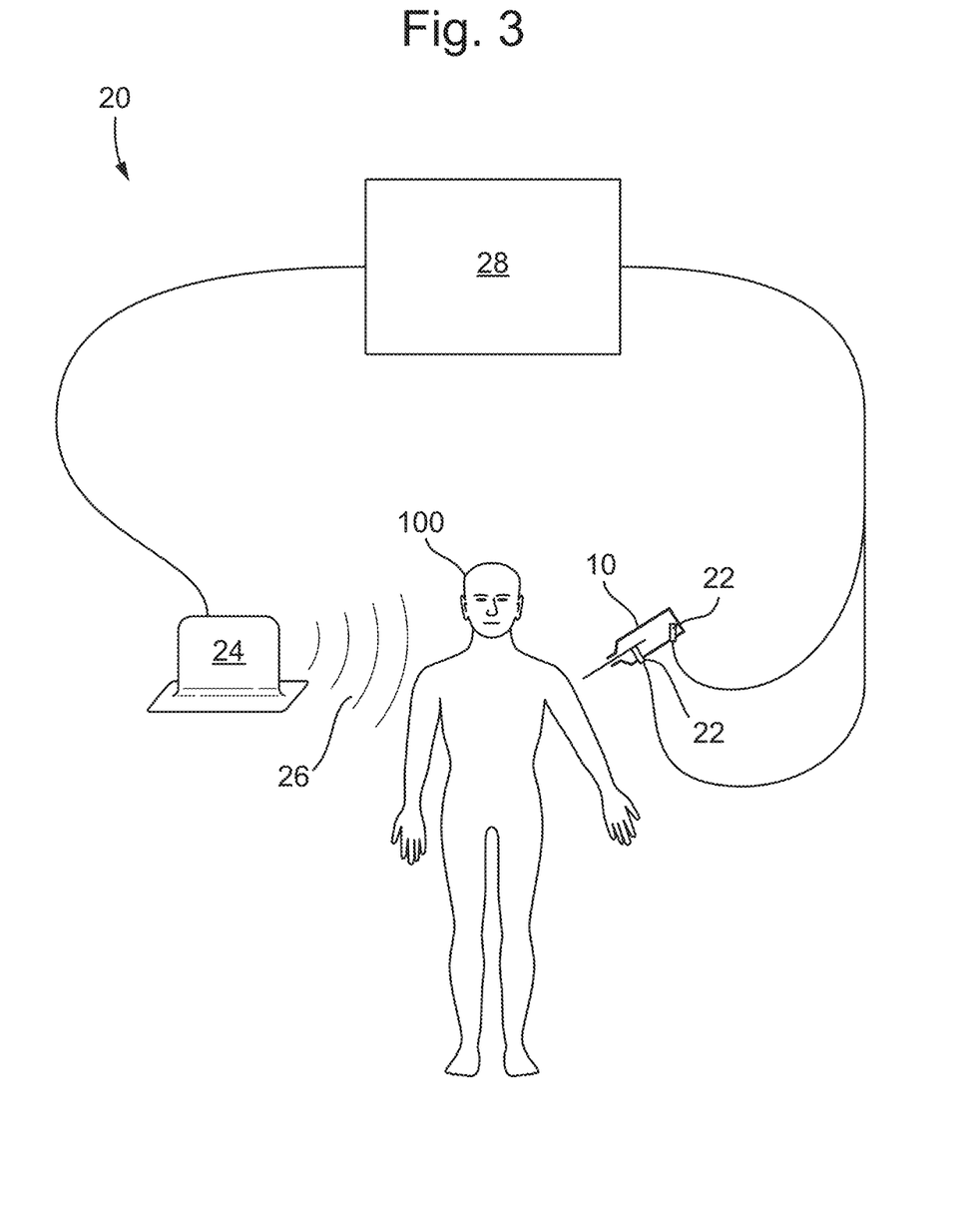
FIG. 3 is a schematic diagram of a first embodiment of a tracking module for use with the system of FIG. 1.

Referring to FIG. 3 of the drawings, such a device may include a tracker sensor 22 configured to communicate using electromagnetic sensing methods in order to provide a full six degrees-of-freedom (DOF) tracking. This sensor 22 may be embedded within, fitted on, or otherwise formed integrally with, the needle device 10. Optionally, the needle device 10 may comprise a plurality of the sensors 22 in order to improve the accuracy of location or orientation tracking. For this reason, sensors 22 are required to be small so as not to weigh down the needle device and must be sufficiently accurate. A magnetic field unit 24 configured to emit a magnetic field 26 can be placed within a specified maximum distance of the object 100 being scanned to provide a continuously variable magnetic field to be sensed. Both magnetic field unit 24 and sensors 22 are communicably coupled to a processing unit 28. The processing unit 28 includes both a processor and memory storage.

In the drawings, the object 100 being scanned is illustrated as the body of a person, however the object 100 may be a body part such as an arm or other part, a manikin, or other training object known in the art, such as a phantom (an object constructed to practice or test ultrasound guided needling).

As the sensors 22 are moved through the region of interest, measurements of the varying magnetic fields between the static tracking base unit and the mobile tracking sensors on the needling device and ultrasound scanning probe are sent to the processing unit 28. The processor may then convert the disturbances into electrical signals indicative of the position and orientation of the needle device 10. As such, the tracking module 20 captures location and orientation data representative of the location and orientation of the needle device 10. This method of movement tracking is highly accurate and would be particularly suitable for the present invention due to its dynamic tracking method of locating the sensors 22 in substantially real-time.

Figure 4A:
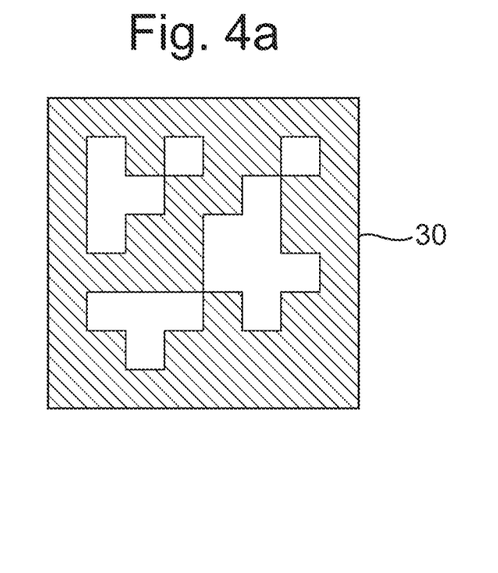
FIGS. 4a and 4b are schematic diagrams of a second embodiment of a tracking module for use with the system of FIG. 1.
Figure 4B:
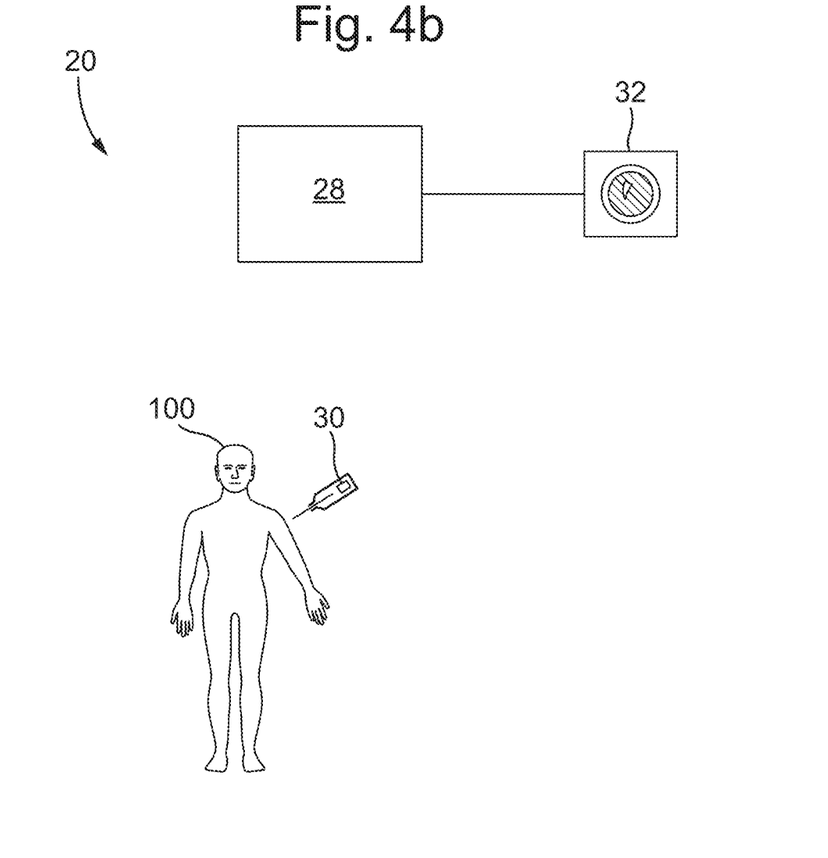

Alternatively, and with reference to FIG. 4 of the drawings, the needle device 10 may include a plurality of visual markers 30 around its visible surface. Each marker 30 can be recorded within the processing unit 28 as being indicative of a specific side, end, surface or part of the needle device 10. An example of a visual marker 14 is illustrated in FIG. 2 of the drawings. The tracking module 12 may then further include a camera 32. The camera 32 may be a single camera, stereo camera or a depth sensor, and can be placed on the needling device 10, ultrasound probe, a headset worn by the operator/trainee, or affixed to a stand or similar, observing the scene. More than one camera 32 in multiple locations can be used to improve accuracy. The camera 32 sends data representative of the needle device 10 and its associated markers to the processing unit 28 which is configured to identify the markers 30 and therefore determine the position of the needle device 10. Using markers 30 and a camera 32 has the advantage of being typically of lower cost than other more complex tracking systems. The skilled reader will know other suitable methods of position and orientation data capture, such as those using stereo cameras, and the invention is not necessarily intended to be limited in this regard.

Figure 5:
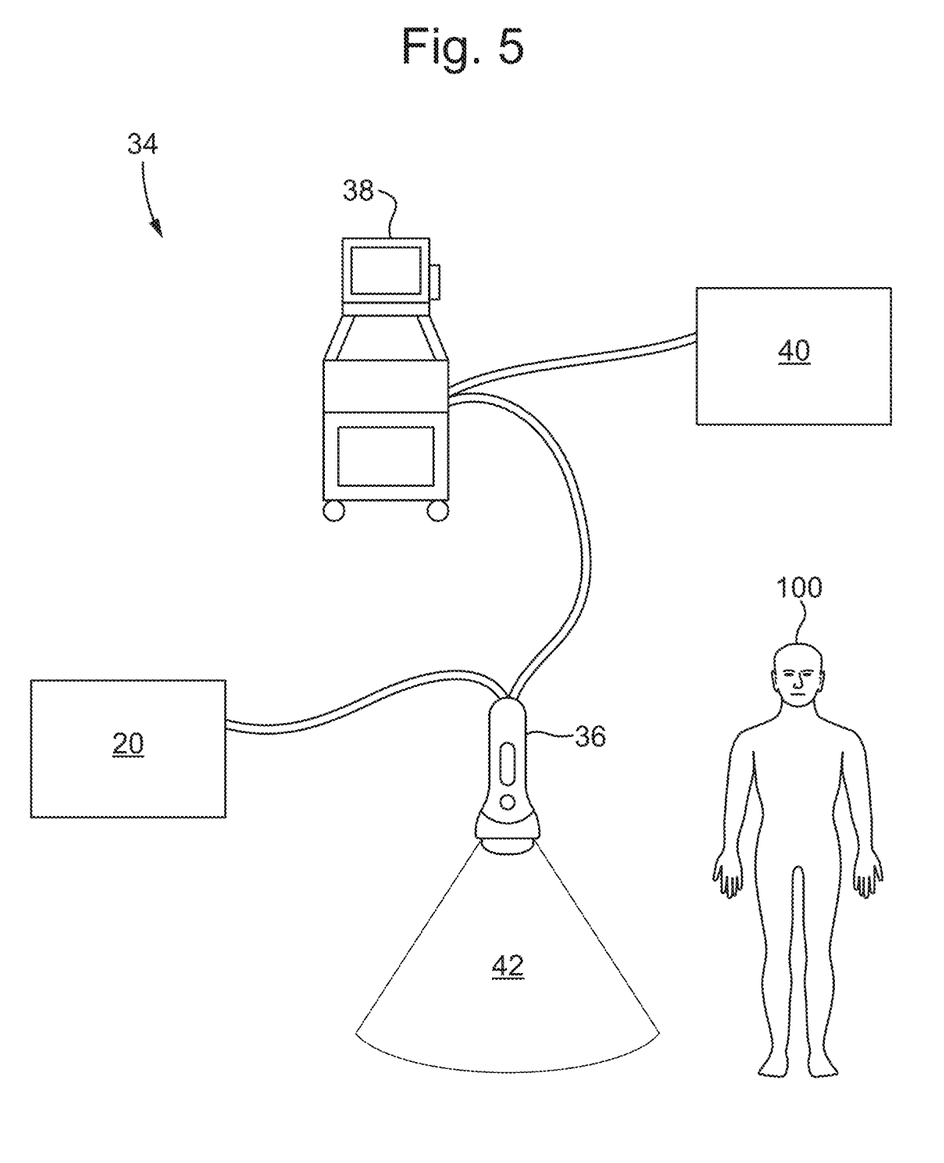
FIG. 5 is an ultrasound module for use in the system of FIG. 1.

Referring now to FIGS. 1 and 5 of the drawings, an ultrasound module 34 includes an ultrasound probe 36 and an ultrasound machine 38. The ultrasound probe 36 is communicably coupled by a connection 35 to the tracking module 20. The ultrasound machine 34 is communicably coupled by connection 39 to a processing module 40, which will be described in more detail hereinafter. In FIG. 1 of the drawings, the ultrasound probe 36 is illustrated as being physically connected to the tracking module 20, however the connection 35 may be wired or wireless. Similarly, the connection 37 between the ultrasound probe 36 and the ultrasound machine 38 may be wired or wireless, and the connection 39 between the ultrasound machine 38 and the processing module 40 may be wired or wireless.

As with the needle device 10, the tracking module 20 is configured to capture data representative of the orientation and/or position of the ultrasound probe 36. The method by which this is done may be one of the methods described above with reference to FIGS. 3a to 4 of the drawings, or an alternative method known in the art. The present invention is not necessarily intended to be limited in this regard.

The ultrasound module 34 is configured to send data representative of a live ultrasound scan to a processing module 22. For example, the ultrasound probe 36 transmits an ultrasound beam 42 into an object, or person, to be scanned. Ultrasound beam 42 at least partially reflects off tissue boundaries, particularly when there is a change in the density of the medium through which the ultrasound beam 42 is travelling. The reflected ultrasound is received by the ultrasound probe 36. In this case the ultrasound probe 36 contains both an ultrasound transmitter and receiver unit within the probe 36. The probe 36 typically includes a signal generator to generate the ultrasound signals a signal processor to converts the received ultrasound into electronic signals. The electronic signals will be different according to the wave characteristics of the reflected ultrasound radiation (e.g., wavelength, frequency, amplitude), which is indicative of the tissue boundary type. The electronic signals are then sent to the ultrasound machine 38 which can then create image data representative of the object being scanned by the ultrasound probe 36. The ultrasound machine 38 creates a scene of the object 100 being scanned. As the probe 36 is moved along the surface of the object being scanned 100 the ultrasound machine creates a series of scenes. This is all done in real-time as the ultrasound probe 36 is moved across the surface of the object/person to be scanned 100.

Therefore the ultrasound machine 38 creates a live video feed of image data representative of an object being scanned 100.

Simultaneously, the tracking module 20 is recording location and orientation data representative of the ultrasound probe 36 and needling device 10.

The processing module 40 is communicably coupled to the ultrasound machine 38, as described above, and additionally to the tracking module 20. As with previously described connections, this connection may be wired or wireless. The tracking module 20 is configured to send data representative of the position and orientation of the needle device 10 and data representative of the position and orientation of the ultrasound probe 36 to the processing module 40.

The processing module 40 is configured to determine the relative offset of the needle device 10 from the ultrasound beam by comparing the two sets of location and/or orientation data from the ultrasound probe 36 and the needle device 10. Therefore, it is necessary to calculate the depth of the ultrasound beam. This can be done in any number of ways, including scraping the ultrasound image data received from the ultrasound machine 20. Other suitable methods will be known in the art.

During use, it is important to ensure the tracking module is fully calibrated. This will depend on the type of tracking used, and suitable calibration methods will be known to those skilled in the art. The invention is not necessarily intended to be limited in this regard.

From this data, the processing module 40 is able to calculate a projected path of a simulation needle 46 (i.e., where the needle would have entered the object 100 had it been a real needle), and determine any overlap of the simulated needle with the ultrasound beam 42.

Referring to FIGS. 1, and 6a to 6d of the drawings, the processing module 40 is communicably coupled to a display unit 43 by a connection 45. The connection 45 may be wired or wireless. The display unit 43 displays the live video feed of the object 100 being scanned, wherein the simulated needle 46 (i.e., the projected path of the needle device 10)

is overlaid. The intersection of the simulated needle 46 with the plane of the ultrasound beam 42 (which is calculated from the relative positions/offset between the needle device 10 and the ultrasound probe 36) is shown on the display. Many visualisation options are possible for this display. For example: methods showing the relative position of the plane 42 and needle 46 in 3d; methods using false-colouring to represent the distance of the needle 46 from the plane 42; methods that render the intersection of the needle 46 and plane 42 into a 2d image that mimics the real-life ultrasound appearance of a needle in tissue, including simulation of anisotropy. Other visualisation options will be apparent to those skilled in the art and the present invention is not necessarily intended to be limited in this regard.

One possible visualisation option is given in FIGS. 6a to 6d, which illustrate exemplary scenes from the video feed which may be displayed on the display unit 43.

Figure 6A:
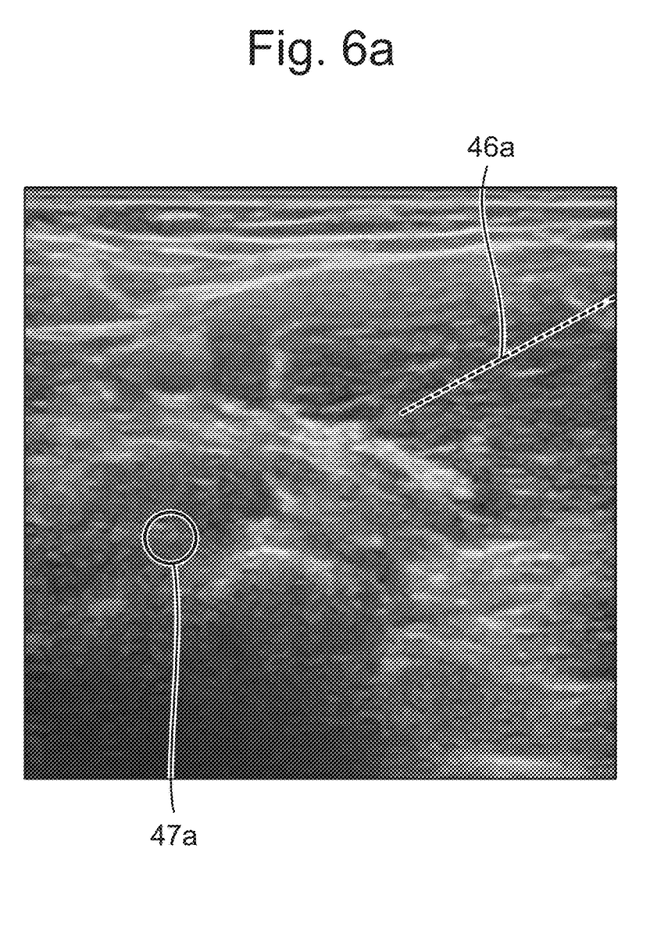
FIGS. 6a to 6d are schematic diagrams showing exemplary scenes as may be viewed on a display unit of the system of FIG. 1.

In FIG. 6a, the simulated needle 46 approaches from the front of the image and does not intersect the plane of the ultrasound beam 42. Therefore, the line is shown as a dashed line 46a. A dashed circle 47a illustrates where the predicted point of the simulated needle 46 would be. This shows the user that the simulated needle 4 has not gone far enough into the patient.

Figure 6B:
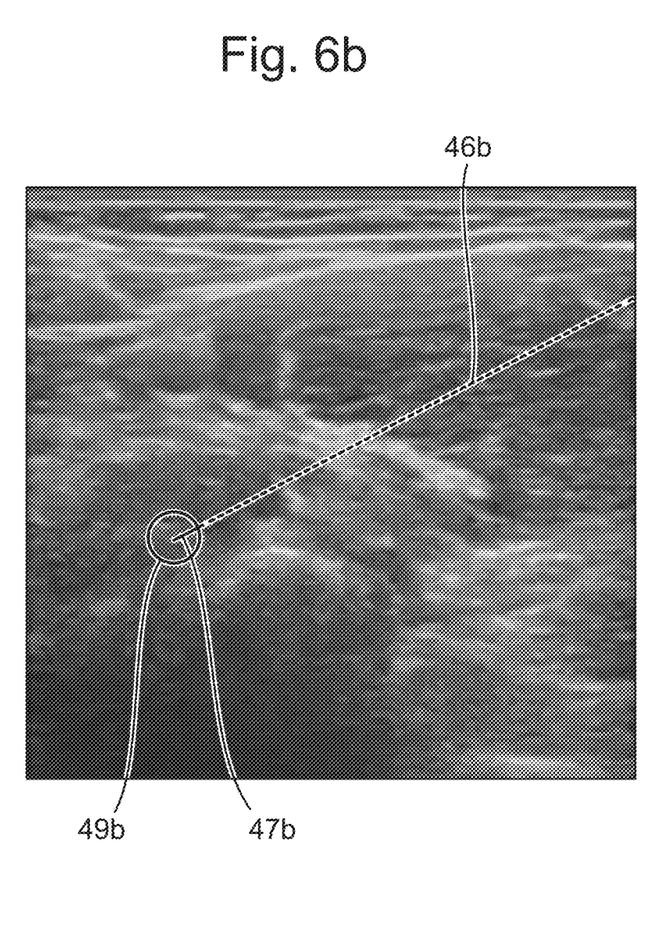

In FIG. 6b of the drawings, the simulated needle 46 approaches from the front of the image, and intersects with the plane of the ultrasound beam 42 for the last 5 millimetres (mm) of the simulated needle 46. Therefore, the line is shown as a dashed line 46b having a solid line 47b at the end. The point of the simulated needle 46 does not need to be predicted as it is "seen" by the system, therefore, it is circled with a solid circle 49b. This shows the user that the simulated needle 46 has reached the correct destination, but they would not be able to see the majority of the needle in a real-life situation because it is mostly out of the plane of the ultrasound beam 42.

Figure 6C:
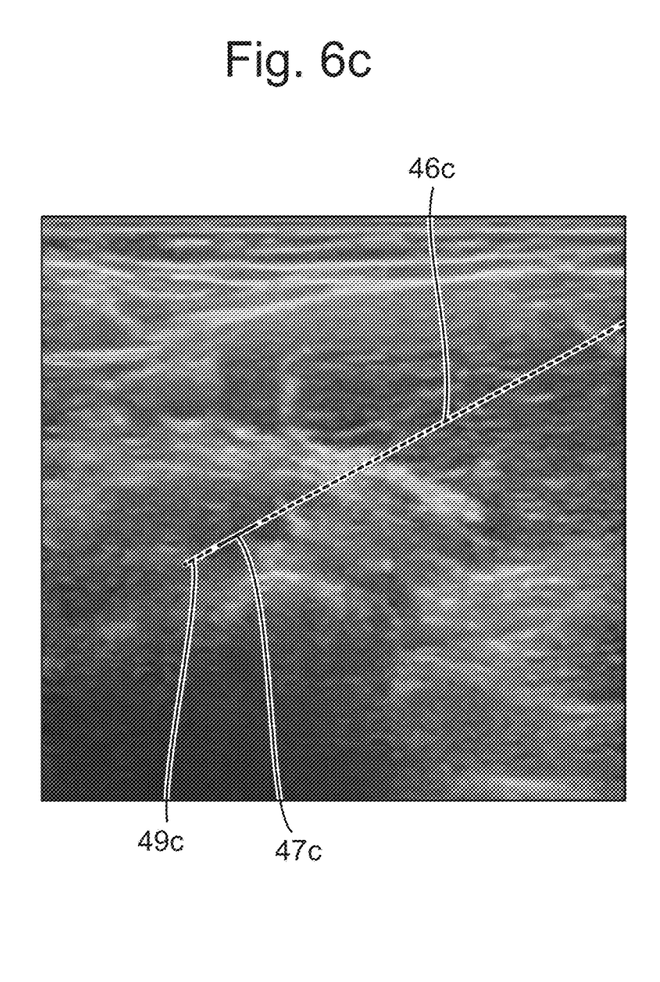

Referring to FIG. 6c of the drawings, the simulated needle 46 approaches from the front of the image, passes through the ultrasound beam 42 and then continues behind the plane of the ultrasound beam. Therefore the line is shown as a dashed line 46c, followed by a solid line 47c, then another solid line 49c. This shows the user that the simulated needle 46 has penetrated too far into the patient.

Figure 6D:
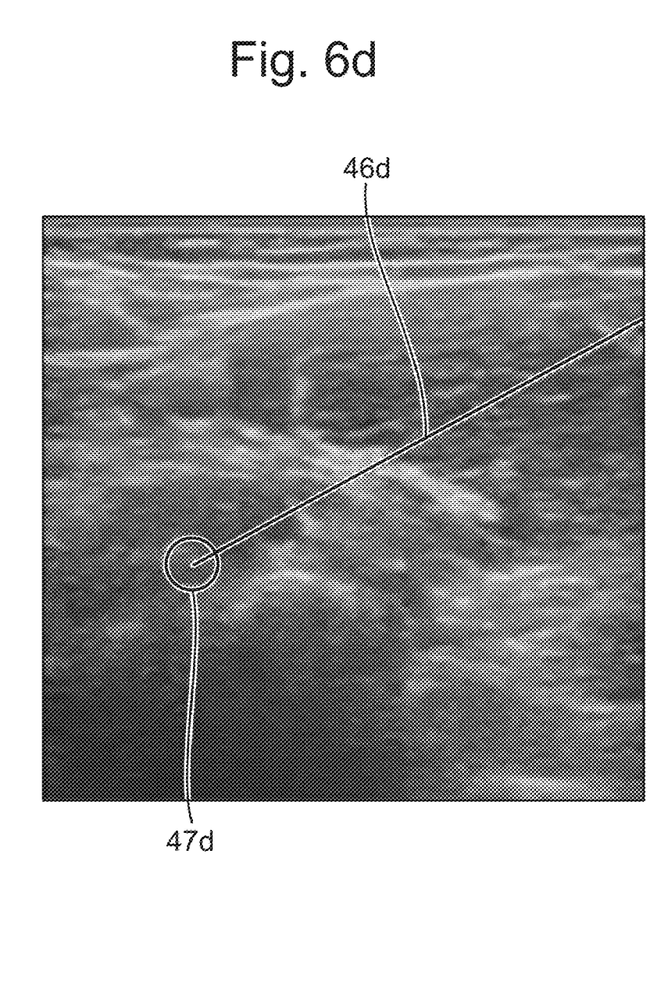

Finally, FIG. 6d of the drawings shows the simulated needle 46 fully in-plane with the ultrasound beam 42 and the point of the simulated needle has reached the correct position, therefore, the line is shown as a solid line 46d and the tip is circled with a solid circle 47d.

Additionally, the processing module 40 is communicably coupled to the needle device 10 by a connection 50. The connection 50 may be wired or wireless. As the simulated needle 46 proceeds through layers of tissue, the processing module 40, which has identified the different tissue layers utilising machine-learning and image processing methods as described later, causes the resistive force of the needle device 10 to change. More specifically, the processing module 40 sends a signal to the needle device 10 when the simulation needle 46 crosses or meets a tissue boundary 44. This signal causes the needle device 10 to change the resistive force supplied by the biasing means 16 (for example, perhaps via the mechanism described above) so as to provide the user with real haptic feedback which mimics the feeling of pushing a needle through a tissue boundary 44 in real-life. The processing module 40 may incorporate the control software and hardware necessary to produce the varying power output needed to control the resistive or driving actuator that controls the needle. Alternatively, the needling device 10 may incorporate a micro-controller which executes the control routines and produces varying power for the actuator from a simple control signal from the main processing module. Such a microcontroller can be variously incorporated into the needling device body or in a small separate control box between itself and the main processing module. The connections between any of these can be wired or wireless. Similarly, handling sensor input related to the functionality of the variable-resistance needling device, such as end-stop switches, may be handled by an on-board microcontroller or by the main processing module.

The resistive force change is dependent on the type of tissue boundary 44 identified by the processing module 40, and the current position and orientation of the needle device 10. In the present exemplary embodiment of the invention, the processing module will use deep learning to identify the various tissue types present in the image data. For example, identification of a high density tissue layer such as bone 44a may cause the processing module 40 to send a signal to the needle device 10 which causes the resistive force to increase to a maximum amount, preventing the needle shaft 14 from retracting into the casing 12 of the needle device 10 further. This corresponds to prevention of advancing the simulation needle 46 further through the tissue layer. Therefore the user will experience true-to-life haptic feedback of a needle meeting a bone. The processing module 40 may identify a tissue boundary 44b. Movement of the simulation needle 46 through this tissue boundary 44b may cause the processing module 40 to send a signal to the needle device 10 to increase the resistance up to a maximum, and then rapidly decrease the resistance to a minimum, emulating a "pop". Therefore, the user will experience true-to-life haptic feedback indicative of a needle pushing through a resistive layer of skin into a softer layer of fat, as they would experience in real life.

Figure 7:
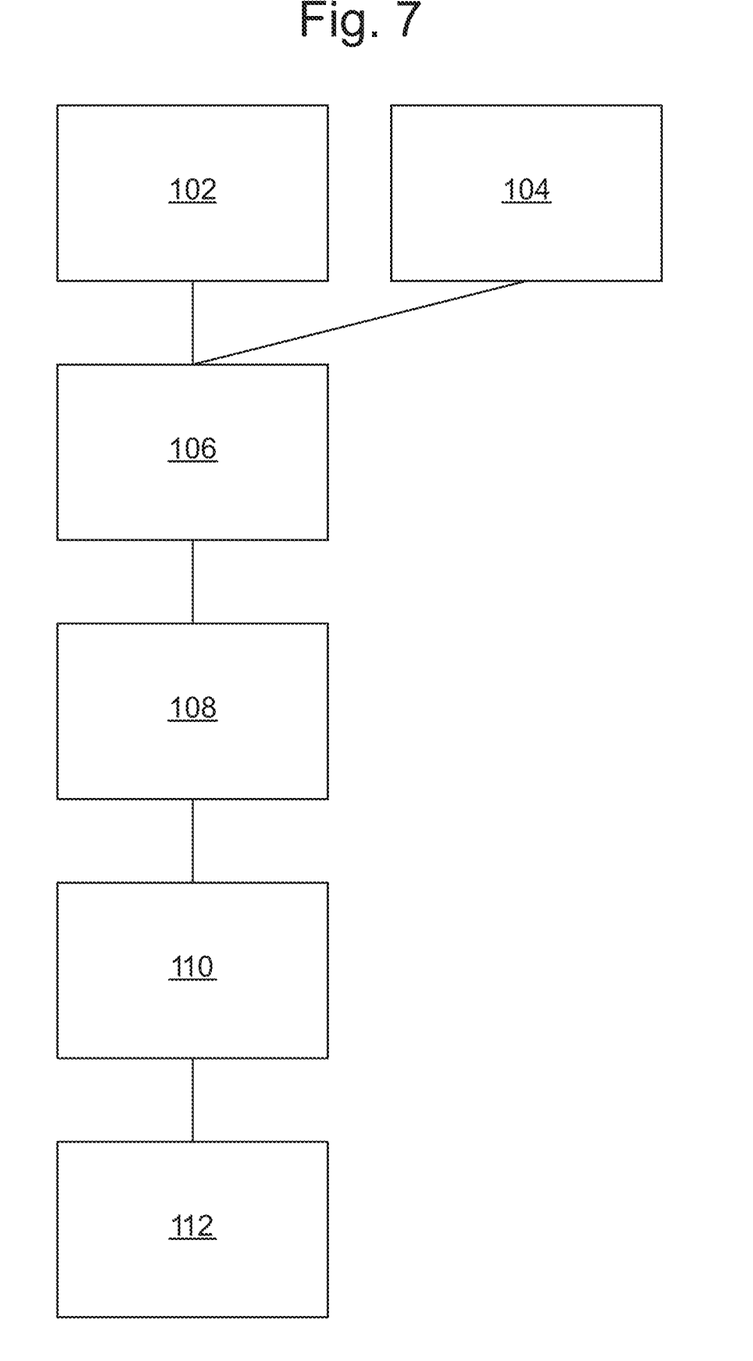
FIG. 7 is a flow diagram illustrating the process of the processing module for use in the system of FIG. 1.

Referring now to FIG. 7 of the drawings, the process performed by the processing module 40 will be described in detail. Firstly, in step 102 the processing module 40 receives data representative of the location of both the ultrasound probe 36 and the needle device 10, and the relative offset between them from the tracking module 20. Simultaneously, at step 104, the processing module 40 receives the live video feed data from the ultrasound machine 38. At step 106, upon receipt of each scene (i.e., each frame of the live video feed) the processing module 40 implements machine-learning to identify tissue boundaries 44 in the live image data received from the ultrasound machine 38.

At step 108, the processing module 40 is configured to transform data representative of the position and/or orientation of the needle device 10, and data representative of the position and/or orientation of the ultrasound probe 36 into image data representative of the simulation needle 46 and where it is relative to the ultrasound beam 42, as illustrated in FIGS. 6a to 6d. At step 110, the image data representative of the respective positions is superposed with each scene of the live video feed to create a live video feed representing the object being scanned and the simulation needle 46, and sends this to the display unit 43 to be displayed. Other visualisation options are possible, such as those that render the needle location into the 2d ultrasound image, as described earlier.

At step 112, the processing module 40 analyses the live video feed data of the object being scanned and the simulation needle 46. Tissue boundaries 44 in the ultrasound image may be identified using machine-learning techniques such as semantic segmentation, perhaps using a Unet-based deep-learning neural network architecture. This provides a per-pixel classification of the tissue types present in the ultrasound image. A mapping of tissue type to tissue characteristics can be applied to these per-pixel tissue classifications. Such tissue characteristics can include information on the force required to push a needle through a tissue boundary of that type, thus producing a per-pixel map of resistive forces. The location and orientation of the needle device 10 in the ultrasound image can then be compared to these per-pixel forces to modulate the current resistive force applied to the needle device 10 causing the resistive force of the needle shaft 14 to change.

This process is repeated continually in real-time as the probe 36 and the needle device 10 are moved by the user.

A user may use the ultrasound probe 18 to scan a body or body part of a willing patient or volunteer. The needle device 10 is then pressed against the body or body part being scanned. As the user applies more pressure, the needle shaft retracts into the casing of the needle device 10, emulating the way a real needle would penetrate a body or body part in real-life. The real-time ultrasound scan images are displayed on a display unit 28, as they would be in a real-life ultrasound guided-needling procedure. A simulation needle 24 is displayed on the screen which corresponds to the position and orientation of the needle device 10 as detected by the tracking module 12. The simulation needle 24 is displayed over the ultrasound scan image which simulates what the user may expect to see in a real ultrasound-guided needling procedure.

As the simulation needle 24 approaches or crosses a tissue boundary in the real-time ultrasound image, the user experiences a change in the force feedback of the needle shaft which emulates how a real needle would behave as it penetrates different tissue boundaries in a patient.

Therefore the system provides a real-time, true-to-life simulation of an ultrasound guided needling procedure which does not require the "patient" to actually be pierced by a needle. For embodiments where the source ultrasound data is generated by a simulator, this system does not require the tissue boundaries to be pre-defined. This improves the quality of the learning experience for the training medical professional, as the system can be used on any number of live volunteers, meaning that the scenarios are widely varied (since each person will be different). The system of the present invention is not limited by a set number of scenarios or anatomical locations on the body since live ultrasound imaging is used.

It will be apparent to those skilled in the art that modifications and variations may be made to the above-described embodiments without departing from the scope of the invention as defined by the appended claims. For example, vets may use the system to rehearse or practise ultrasound-guided needling procedures on animals.

In one exemplary embodiment of the invention, the display unit 43 may include a touchscreen display.

Other colour schemes and visual indicators for the display of the simulated needle 46 may be used, those described above are just examples.

Optionally, the biasing means may be at least one elastic band. The biasing means may be a plurality of elastic bands which work together to provide a baseline resistive force on the needle shaft.

Similarly, the ultrasound module 34 may be provided as part of the ultrasound guided needling simulation system, or may be an ultrasound machine already present in, for example, a hospital or medical centre. This has the unique advantage of allowing the system to be used with pre-existing equipment, therefore reducing the cost of the system as a training device, and further simulating a "true-to-life" experience for the trainee medical professional. Similarly, the display unit 43, may also be part of the pre-existing equipment present in hospitals, medical centres and so on.

There are many different mechanisms by which the retractable needle may be driven. In one embodiment, the needle is driven/resisted by a stationary friction wheel and is supported on the opposite side by a stationary free wheel. The driving wheel has a coaxial bevel gear which is in turn driven by a bevel gear attached to a small motor parallel to the needle.

Alternatively, a rack-and-pinion arrangement could be made where the needle has small gear teeth along its length and the friction wheel is replaced with a cog. The friction version has the possible safety advantage of being able to slip under sudden extreme force.

Alternatively, the needle shaft may include a bracket at its enclosed end 14b having a threaded hole there-through. The outer surface of the needle shaft 14 comprises a threaded shaft portion the length of the intended travel which engages with the threaded hole. The bracket then can be rotated by a motor thus pushing/pulling the needle back and forth.

Optionally, such a braking mechanism may comprise a pair of frictional surfaces (e.g., rubber pads) pressed against opposing sides of the needle so as to "clamp" the needle thus increasing the friction on it, therefore imparting a larger resistance against pressure applied to the exposed end of the needle 14b. The "clamping" force can be varied so as to vary the amount of force needed to overcoming the braking force on the needle shaft 14, therefore varying the resistive force of the needle shaft 14.

In addition to the tracking module described above, the simulation system may further comprise a sensor present in the needle device configured to detect the degree of retraction or extension of the needle within the needle device in order to provide additional accuracy when calculating and generating the simulated needle. This can be achieved by using a rotary encoder device fitted to the mechanisms that interface with the needle shaft, or to the output shaft of a motor which is providing the resistive force of the needle. Rather than directly measuring force or pressure on the needle shaft, this method infers the force by measuring the rotational position of the driving motor. As the operator pushes the needle into the barrel, the rotary encoder detects this, and the control system can apply current to the motor to attempt to return the needle back to its previous position. With adequate sensor resolution and processing speed, the motor can react "instantaneously" such that the operator barely notices that the needle moved at all. The speed and strength of this reaction can be intelligently controlled such that varying tissue characteristics can be simulated. As an example, using a PID control scheme: The P gain represents pliability, the D gain represents viscosity and the I gain represents elasticity. Penetrability can be controlled with one further value that controls the rate of setpoint drift towards the current user-imparted offset. A negative constant setpoint drift offset effectively replaces the spring/rubber band.

Alternatively, index markers may be used coupled with a LED and light detector to measure the position of the needle in the body of the needle device. Additional sensors may be used to detect when the needle has reached either extent of its travel i.e. 'end-stop' switches.

It will be apparent to those skilled in the art that modifications and variations may be made to the above-described mechanisms without departing from the scope of the invention as defined by the appended claims.

The invention claimed is:

1. A computer-implemented simulation system comprising a needle device having a tip and a retractable needle shaft comprising a resistance mechanism which can be activated to vary the resistance of the needle shaft, an ultrasound image data source, comprising at least one of an ultrasound probe configured to transmit an ultrasound beam and an ultrasound simulator, a display unit and a processing module, wherein the processing module is configured to:
   receive ultrasound image data representative of a subject being scanned,
   receive position and orientation data representative of the ultrasound probe and the needle device,
   calculate a projected path for the needle device and generate a simulation needle from the projected path,
   overlay the simulation needle on the ultrasound image data representative of the subject being scanned so as to generate one or more scenes of the object being scanned using the ultrasound image data and the position and orientation data,
   send the one or more scenes to the display unit for display,
   update the one or more scenes in real-time as location and orientation data changes,
   analyse, in real-time, the one or more scenes to locate various tissue types present in an ultrasound image, and
   calculate a proximity of the needle device tip to the tissue types present in the ultrasound image,
   wherein, the processing module is configured to, when the simulation needle is determined to intersect with an identified tissue type, modulate a signal and send the modulated signal to the resistance mechanism, thereby to cause a change in the resistance of the retractable needle shaft.

2. A system according to claim 1, wherein a size of a change in the resistance of the retractable needle shaft is dependent on the identified tissue type.

3. A system according to claim 1, further including a tracking module configured to capture position and orientation data representative of the position and orientation of the ultrasound probe, and the position and orientation of the needle device.

4. A system according to claim 3, wherein the ultrasound probe and the needle device each comprise at least one electromagnetic sensor, and wherein the tracking module comprises a magnetic field unit and a processing unit.

5. A system according to claim 3, wherein the tracking module comprises a camera, and the ultrasonic probe and the needle device each comprise at least one visual marker.

6. A system according to claim 1, wherein the tissue types present in the ultrasound image are identified using machine learning.

7. A system according to claim 1, wherein the resistance mechanism of the needle device comprises a biasing means configured to provide a resistive force, and a braking mechanism configured to increase friction on the needle shaft, wherein the braking mechanism is communicably coupled to the processing module and configured to receive modulated signals therefrom.

8. A system according to claim 7, wherein the biasing means is a spring.

9. A system according to claim 7, wherein the biasing means is provided by at least one elastic band.

10. A system according to claim 1, wherein the resistance mechanism of the needle device comprises a motor attached to a rotary encoder, communicably coupled to the processing module and configured to receive modulated signals therefrom.

11. A system according to claim 1, wherein the simulation needle is a graphical representation of a needle shaft overlaid on the live video feed.

12. A system according to claim 1, wherein the processing module is additionally configured to identify where the simulation needle is in relation to the plane of the ultrasound beam, and to update the display of the simulation needle according to the relative positions of the simulation needle and the ultrasound beam.

13. A system according to claim 12, wherein the relative positions and orientations of the simulation needle and the ultrasound beam are displayed in 3d.

14. A system according to claim 12, wherein the display of the relative positions and orientations of the simulation needle and ultrasound beam are displayed in 2d.

15. A system according to claim 14, wherein the 2d display of the simulated needle is configured to mimic a real needle when viewed using ultrasound.

16. A computer-implemented method for simulating ultrasound guided needling, the method comprising:
   a) receiving ultrasound image data representative of a subject being scanned from an ultrasound image data source comprising at least one of an ultrasound probe configured to transmit an ultrasound beam and an ultrasound simulator,
   b) receiving position and orientation data representative of an ultrasound probe and needle device, the needle device having a retractable needle shaft, and a tip,
   c) calculating a projected path for the needle device and generate a simulation needle from the projected path,
   d) overlaying the simulation needle on the ultrasound image data representative of the subject being scanned so as to generate one or more scenes of the object being scanned using the ultrasound image data and the position and orientation data,
   (e) sending the one or more scenes to a display unit for display, updating the one or more scenes in real-time as the position and orientation data changes,
   f) analysing, in real-time, the one or more scenes to locate tissue types present in an ultrasound image, and
   g) calculating a proximity of the needle device tip to the tissue types present in the ultrasound image;
   wherein, when the simulation needle is determined to intersect with an identified tissue type, the method further includes generating a modulated signal and sending said modulated signal to the resistance mechanism, to cause a change in the resistance of the retractable needle shaft.

\* \* \* \* \*